(12) United States Patent
Knapp et al.

(10) Patent No.: US 7,731,884 B2
(45) Date of Patent: Jun. 8, 2010

(54) MOLDED GASKET AND METHOD OF MAKING

(75) Inventors: Mark Knapp, Ravenna, OH (US); Jeffrey Michael Smith, Hinckley, OH (US)

(73) Assignees: Advanced Elastomer Systems, L.P., Akron, OH (US); SpringSeal, Inc., Streetsboro, OH (US)

( * ) Notice: Subject to any disclaimer, the term of this patent is extended or adjusted under 35 U.S.C. 154(b) by 217 days.

(21) Appl. No.: 11/666,763

(22) PCT Filed: Dec. 7, 2005

(86) PCT No.: PCT/US2005/044887

§ 371 (c)(1), (2), (4) Date: May 2, 2007

(87) PCT Pub. No.: WO2006/063338

PCT Pub. Date: Jun. 15, 2006

(65) Prior Publication Data

US 2007/0290455 A1   Dec. 20, 2007

Related U.S. Application Data

(60) Provisional application No. 60/634,209, filed on Dec. 8, 2004.

(51) Int. Cl.
*B29C 45/14* (2006.01)
*B29C 45/16* (2006.01)

(52) U.S. Cl. .................. 264/259; 277/627; 264/251; 264/255; 264/257

(58) Field of Classification Search .................. None
See application file for complete search history.

(56) References Cited

U.S. PATENT DOCUMENTS

| 2,230,725 A | 2/1941 | Nathan |
| 2,259,940 A | 10/1941 | Nathan |
| 2,578,933 A | 12/1951 | Hunter et al. |
| 2,953,398 A | 9/1960 | Haugen et al. |

(Continued)

FOREIGN PATENT DOCUMENTS

DE   3826622   2/1990

(Continued)

OTHER PUBLICATIONS

International Preliminary Examination Report, Aug. 29, 2006, Knapp, Mark.

(Continued)

*Primary Examiner*—Monica A Huson
(74) *Attorney, Agent, or Firm*—Tarolli, Sundheim, Covell & Tummino LLP

(57) ABSTRACT

The present invention is directed to an annular gasket for providing a fluid-tight seal between an inner pipe and an outer pipe, when the pipes are in a relative surrounded and surrounding relationship. The gasket includes a gasket portion configured to sealingly engage the inner and outer pipes when the pipes are in a relative surrounded and surrounding relationship. The gasket includes a low coefficient of friction surface which is applied to the gasket portion. The gasket may be formed by a method in which a low coefficient of friction film is inserted into a mold before injection of compounds used to form the gasket.

21 Claims, 3 Drawing Sheets

U.S. PATENT DOCUMENTS

| | | | |
|---|---|---|---|
| 3,031,200 | A | 4/1962 | Hamer |
| 3,118,682 | A | 1/1964 | Fredd |
| 3,380,763 | A | 4/1968 | Schmunk |
| 3,386,745 | A | 6/1968 | Hein |
| 3,445,120 | A | 5/1969 | Barr |
| 3,469,854 | A | 9/1969 | Linwood |
| 3,695,639 | A | 10/1972 | Shire et al. |
| 3,796,447 | A | 3/1974 | de Putter |
| 3,813,107 | A | 5/1974 | Ditcher |
| 3,856,315 | A | 12/1974 | Stansbury |
| 3,865,386 | A | 2/1975 | Wilke |
| 3,955,834 | A | 5/1976 | Ahlrot |
| 4,018,461 | A | 4/1977 | Bram |
| 4,097,074 | A | 6/1978 | Nagao et al. |
| 4,188,040 | A | 2/1980 | Wolf et al. |
| 4,223,895 | A | 9/1980 | Roberts, Jr. et al. |
| 4,298,206 | A | 11/1981 | Kojima |
| 4,333,662 | A | 6/1982 | Jones |
| 4,365,818 | A | 12/1982 | Tolliver |
| 4,387,900 | A | 6/1983 | Ditcher et al. |
| 4,394,024 | A | 7/1983 | Delhaes |
| 4,395,159 | A | 7/1983 | Karuks et al. |
| 4,487,421 | A | 12/1984 | Housas et al. |
| 4,552,914 | A | 11/1985 | Sterling |
| 4,566,704 | A | 1/1986 | van Dongeren |
| 4,575,128 | A | 3/1986 | Sundquist |
| 4,585,026 | A | 4/1986 | Norton |
| 4,602,792 | A | 7/1986 | Andrick |
| 4,602,793 | A | 7/1986 | Andrick |
| 4,630,848 | A | 12/1986 | Twist et al. |
| 4,641,858 | A | 2/1987 | Roux |
| 4,642,269 | A | 2/1987 | Kohyama et al. |
| 4,702,502 | A | 10/1987 | Shade et al. |
| 4,711,474 | A | 12/1987 | Patrick |
| 4,743,422 | A | 5/1988 | Kalriis-Nielsen et al. |
| 4,772,154 | A | 9/1988 | Caroulle |
| 4,795,166 | A | 1/1989 | Irmler |
| 4,818,209 | A | 4/1989 | Petersson et al. |
| 4,826,028 | A | 5/1989 | Vassallo et al. |
| 4,834,398 | A | 5/1989 | Guzowski et al. |
| 4,969,653 | A | 11/1990 | Breen |
| 5,013,052 | A | 5/1991 | Butler et al. |
| 5,045,635 | A | 9/1991 | Kaplo et al. |
| 5,058,907 | A | 10/1991 | Percebois et al. |
| 5,064,207 | A | 11/1991 | Bengtsson |
| 5,067,751 | A | 11/1991 | Walworth et al. |
| 5,106,129 | A | 4/1992 | Camacho et al. |
| 5,114,162 | A | 5/1992 | Ditcher |
| 5,143,381 | A | 9/1992 | Temple |
| 5,169,161 | A | 12/1992 | Jones |
| 5,180,196 | A | 1/1993 | Skinner |
| 5,288,087 | A | 2/1994 | Bertoldo |
| 5,324,083 | A | 6/1994 | Vogelsang |
| 5,326,138 | A | 7/1994 | Claes et al. |
| 5,346,662 | A | 9/1994 | Black et al. |
| 5,360,851 | A | 11/1994 | Feder et al. |
| 5,407,236 | A | 4/1995 | Schwarz et al. |
| 5,415,436 | A | 5/1995 | Claes et al. |
| 5,542,717 | A | 8/1996 | Rea et al. |
| 5,573,279 | A | 11/1996 | Rea et al. |
| 5,577,741 | A | 11/1996 | Sink |
| 5,603,532 | A | 2/1997 | Guest |
| 5,626,349 | A | 5/1997 | Sutherland et al. |
| 5,687,976 | A | 11/1997 | Andrick et al. |
| 5,735,528 | A | 4/1998 | Olsson |
| 5,806,593 | A | 9/1998 | Surles |
| 5,813,705 | A | 9/1998 | Dole |
| 5,973,061 | A | 10/1999 | Feder et al. |
| 5,988,695 | A | 11/1999 | Corbett, Jr. |
| 5,992,469 | A | 11/1999 | Hegler |
| 5,996,635 | A | 12/1999 | Hegler |
| 6,082,741 | A | 7/2000 | Gregoire et al. |
| 6,126,173 | A | 10/2000 | Westhoff et al. |
| 6,126,209 | A | 10/2000 | Goddard |
| 6,170,883 | B1 | 1/2001 | Mattsson et al. |
| 6,193,285 | B1 | 2/2001 | Proctor |
| 6,237,966 | B1 | 5/2001 | Kearns |
| 6,328,309 | B1 | 12/2001 | Corbett, Jr. |
| 6,343,623 | B2 | 2/2002 | Hegler |
| 6,359,073 | B1 | 3/2002 | Babb et al. |
| 6,367,802 | B1 | 4/2002 | Knapp |
| 6,476,141 | B1 | 11/2002 | Chang et al. |
| 6,550,775 | B2 | 4/2003 | Knapp |
| 6,620,369 | B1 | 9/2003 | Mead |
| 6,726,219 | B2 | 4/2004 | Bivens |
| 6,739,632 | B1 | 5/2004 | Thomas et al. |
| 7,469,905 | B2 | 12/2008 | Knapp |
| 2004/0041347 | A1 | 3/2004 | Beach et al. |
| 2004/0072949 | A1 | 4/2004 | Ding et al. |
| 2006/0279084 | A1 | 12/2006 | Collins |
| 2007/0290455 | A1 | 12/2007 | Knapp et al. |

FOREIGN PATENT DOCUMENTS

| | | |
|---|---|---|
| DE | 3909381 | 12/1990 |
| DE | 19628639 | 1/1998 |
| EP | 0311296 | 4/1989 |
| GB | 2331137 | 5/1999 |

OTHER PUBLICATIONS

International Search Report, Apr. 19, 2006, Knapp, Mark.
International Search Report with the Written Opinion, Apr. 19, 2006, Knapp, Mark.
International Search Report dated Sep. 24, 2009; 25 pages.

MOLDED GASKET AND METHOD OF MAKING

CROSS-REFERENCES TO RELATED APPLICATIONS

The present application claims priority to U.S. Provisional Patent Application No. 60/634,209, entitled "MOLDED GASKET AND METHOD OF MAKING", filed Dec. 8, 2004 and International Patent Application Ser. No. PCT/US05/044887 filed Dec. 7, 2005. The entireties of the aforementioned patent applications are incorporated herein by reference for all purposes.

FIELD OF THE INVENTION

This invention relates generally to gaskets, and more particularly to gaskets including a low coefficient of friction surface.

BACKGROUND

It is well known to form a seal between two pipe sections, such as two corrugated pipe sections, where the end of one of the pipe sections has annular grooves and one of the pipe sections has an enlarged bell portion at one end. Some prior art elastomeric gaskets are placed around the end of the pipe section having annular grooves. The pipe section having annular grooves is inserted into an enlarged bell portion of a second pipe section. The elastomeric gasket contacts each of the pipe sections to form a seal between the pipe sections.

Typically, a large frictional force is encountered when the inner pipe and the elastomeric gasket is inserted into the outer pipe. As one end of the inner pipe is pushed into the enlarged end or bell of the outer pipe section or pipe connector, the gasket is sometimes pulled from the groove by the large frictional force. When the pipe is not properly sealed, ground water may leak into the pipe or fluid may leak out of the pipe and contaminate the ground.

Lubricant has been manually applied to elastomeric gaskets before the inner pipe and the gasket is inserted into the outer pipe. The lubricant reduces the frictional force between the gasket and the outer pipe. The reduced frictional force reduces the likelihood that the gasket will be pulled from the groove by the frictional force. The manual application of the lubricant is labor intensive. In addition, the manually applied lubricant is wiped from the gasket if the pipe joint is disassembled. As a result, the lubricant must be reapplied before the pipe joint is reassembled.

Prior art methods have been developed that self lubricate gaskets as they are assembled. For example, U.S. Pat. No. 4,365,318 to Tolliver discloses a seal including a cavity containing a lubricant, which is released when one pipe joint is slid over the seal. U.S. Pat. No. 5,143,381 to Temple is directed to a seal, which has an internal chamber containing a lubricant. A slit in the body of the seal extends into the chamber. When one pipe is moved over another pipe end, the slit is spread, thereby releasing the lubricant against the sealing surface. U.S. Pat. No. 5,626,349 to Sutherland et al. concerns a sealing ring containing a lubricant enclosed within a membrane formed on the ring's body. When a connecting pipe is slid into the pipe joint, the membrane is ruptured, releasing the lubricant and reducing the frictional forces imparted on the sealing ring during the joining of the pipes. U.S. Pat. No. 5,735,528 to Olsson discloses a seal containing a lubricant. The lubricant migrates to the surface of the seal, thereby providing self-lubricating properties. Each of these methods provide the lubricant only the first time, or a limited number of times, the gasket forms a seal. The lubricant is eventually wiped off or spent. After the lubricant is wiped off or spent, a lubricant may need to be manually applied to ensure a proper seal.

There is a need for a gasket that includes a low coefficient of friction surface, which aids in the assembly and disassembly of pipe joints.

SUMMARY OF THE DISCLOSURE

The present invention is directed to an annular gasket for providing a fluid-tight seal between an inner pipe and an outer pipe, when the pipes are in a relative surrounded and surrounding relationship. The gasket includes a gasket portion configured to sealingly engage the inner and outer pipes when the pipes are in a relative surrounded and surrounding relationship. The gasket includes a low coefficient of friction surface, which is applied to the gasket portion.

In one embodiment, a low coefficient of friction material is applied to the gasket material as a film in a mold. In another embodiment, the low coefficient of friction material can be bonded to the gasket material. In certain cases, the low coefficient of friction material can be preformed into an annular ring prior to being applied to the gasket material. In alternate embodiments, the low coefficient of friction material may be thermally formed and bonded to the gasket material as in the known process of "thermoforming".

The present invention is also directed to a coupling formed between two sections of piping. The coupling includes an outer pipe section and an inner pipe section, which extends into an end of the outer pipe section. A gasket is positioned between the outer pipe section and the inner pipe section to provide a fluid-tight seal between the two pipe sections. The gasket includes a gasket portion that sealingly engages each of the two sections of piping and a low coefficient of friction film applied to an exposed surface of the gasket portion.

One aspect of the invention is method of making a gasket having a low coefficient of friction surface for use in creating a seal between adjoining pipe sections. The method includes inserting a low coefficient of friction film into a mold cavity then injecting a gasket material into the mold cavity. The formed gasket is removed from the mold where the gasket includes a low coefficient of friction film on one of its exposed surfaces.

In one embodiment of the method, the low coefficient of friction film is preformed prior to insertion into the mold cavity. In another variation of the method, the low coefficient of friction material can be injected into the mold cavity. In one embodiment of the method, the injection includes a first injection of a material having a first durometer and a second injection of material having a second relatively lower durometer where the second durometer material forms a seal between two adjoining pipe sections when the gasket is in use. In one embodiment, the first material having a first durometer is adapted for being bonded to a first pipe section. Further, the first material, in an alternative embodiment, is a rigid material. In one embodiment, the second material is an elastomeric type material that can create a fluid tight seal between the adjoining pipe sections.

Another aspect of the invention is a method of making a gasket for creating a fluid-tight seal between adjoining pipe sections including injecting a low coefficient of friction material into the mold cavity. This first injection is cooled and is followed by an injection of a gasket type material. The molded gasket including a low coefficient of friction surface is then removed from the mold. Alternatively, the low coefficient of friction material is injected into the mold and is subsequently permitted to cool. Next a material having a first durometer is injected into the mold and is permitted to cool. A third material having a second relatively lower durometer is injected into the mold and permitted to cool. Finally, the molded gasket having a low coefficient of friction material and including two additional materials having different durometer is removed from the mold.

DISCLOSURE OF THE INVENTION

Figure 1:
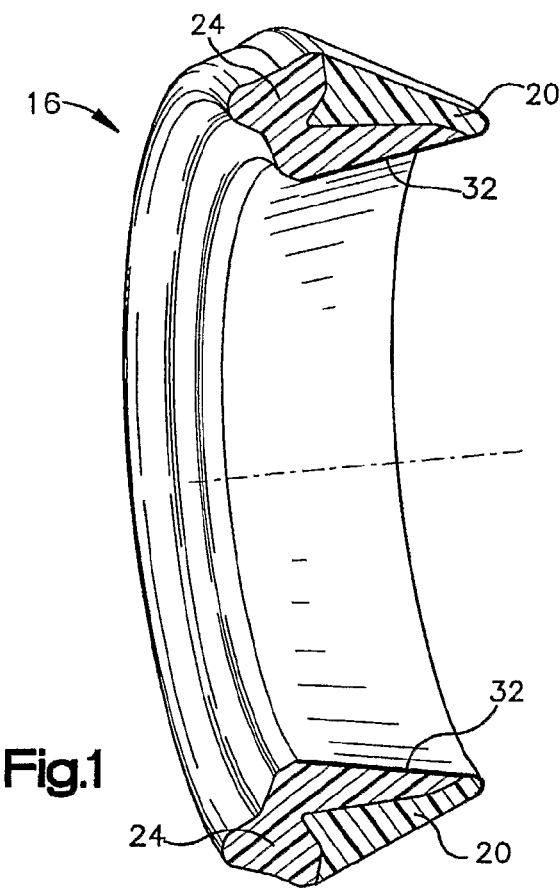
FIG. 1 is sectional view a portion of the annular gasket of the present invention.

Turning now to the Figures, FIG. 1 illustrates an annular gasket 16 in accordance with the present invention. The illustrated gasket 16 includes three sections. A first section 20 is formed from a rigid material. A second section 24 is formed from a gasket type material that is less rigid than the first section and a third section 32 is formed from a low coefficient of friction material. Each section is described in more detail below.

Figure 2:
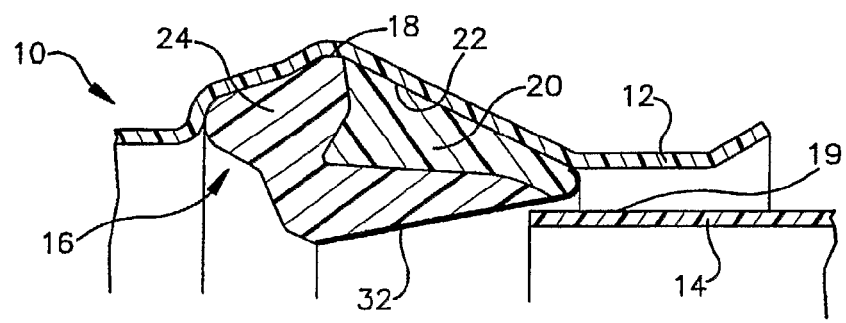
FIG. 2 is a sectional view of a pipe joint including two pipe sections prior to coupling the pipe sections together.
Figure 3:
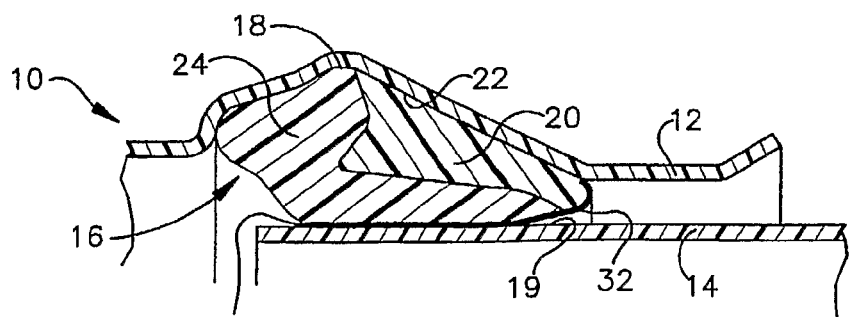
FIG. 3 is a sectional view of the pipe joint of FIG. 2 wherein the two pipe sections are in the coupled state.

FIG. 2 and FIG. 3 illustrate a pipe coupling 10 including the gasket. The coupling includes an outer pipe 12 and an inner pipe 14. The gasket 16 is situated in a sealing arrangement between the outer pipe 12 and inner pipe 14. In the illustrated embodiment, the outer pipe section 12 includes an annular recess or groove 18, which supports a portion of the gasket 16. It should be readily apparent that the annular recess or groove could be included in the inner pipe, rather than the outer pipe.

In the exemplary embodiment, the first section 20 is formed from a rigid material having a minimum Shore A hardness of 87 durometer. This portion of the gasket 16 can be bonded to the internal surface along the annular groove 18 of the outer pipe section 12 along an internal flat surface portion generally defined by reference number 22. Bonding of this rigid material to the internal surface of the outer pipe 12 can be accomplished by mechanical interference, spot welding, adhesive or other methods generally known to those of ordinary skill in the art. The bonding helps to hold the gasket in the annular groove 18 during assembly of the pipe coupling 10 as well as providing additional sealing properties between the gasket 16 and the outer pipe 12. Any thermoplastic meeting the described functioning will suffice, for example, polyolefin thermoplastics, including the polyolefin based, hard thermoplastic vulcanizates having polypropylene thermoplastic and dispersed, cross-linked ethylene-propylene-diene monomer rubber. The high Shore A and Shore D Santoprene® products of Advanced Elastomers Systems, L.P., having a principal place of business at 388 S. Main Street, Akron, Ohio 44311, are particularly suitable.

The second section 24 of the gasket 16 is formed from a material having a durometer relatively lower than that of the material of the first section 20 of the gasket 18. In one embodiment, the second section has about 55 Shore A durometer. The second section 24 is bonded to the material of the first section 20 and extends from the first section 20 horizontally along the direction of the length of the outer pipe 12 to fill the annular groove 18 and making sealing contact with the internal surface of the annular groove 18. The material of the second section 24 is formed from an elastomeric gasket type material. Any elastomeric material for use in making gaskets could be used to make the second section of the gasket 16. The second section 24 of gasket material further extends radially inward from the outer pipe's internal surface towards the center of the pipe beyond the depth of the annular groove 18 in the outer pipe section 12. When the inner pipe 14 is coupled to the outer pipe 12, the second section 24 of the gasket becomes depressed to provide compression of the gasket 16 to aid in the sealing or the pipe coupling 10.

The third section 32 of material is cohered to the material of the second section 24. The material of the third section 32 is a material having a low coefficient of friction. The material is cohered to that portion of the second section 24, which first makes contact with the inner pipe 14 during assembly of the coupling 10. The low coefficient of friction material typically has a Shore D hardness of 40 or higher.

The low coefficient of friction material aids in assembly of the pipe coupling. By providing a surface having a lower coefficient of friction, the inner pipe section 14 can more easily be forced into the outer pipe section 12 having the gasket 16 present in its respective sealing location (i.e., annular groove 18) while providing a sealing engagement of the inner pipe section 14 with the gasket 16.

In FIG. 2, the inner pipe section 14 is in a pre-coupling position. When the inner pipe 14 is forced into the outer pipe 12 having the gasket 16 installed, the inner pipe first makes contact with the low coefficient of friction surface 32 of the gasket 16. As the inner pipe 14 is forced onto the gasket 16, this low coefficient of friction portion 32 allows the inner pipe 14 to slide easily into the gasket 16. FIG. 3 illustrates the inner pipe 14 completely inserted into the coupled position. As shown, the gasket 16 is compressed. This compression allows for the gasket 16 to apply force to the inner surface of the outer pipe 12 as well as force to the outer surface of the inner pipe 14 and, thus, provides a fluid tight seal. In the illustrated embodiment, the inner pipe, once coupled, is in sealing contact with the low coefficient of fiction surface 32 along the inner pipers 14 external surface 19. This surface 19 sealingly engages the outer surface of the inner pipe 14 and the gasket 16. The external surface 19 contacts the low coefficient of friction section 32 of the gasket 16 and makes sealing contact at a joint generally shown by reference number 36. In an alternative embodiment, the low coefficient of friction surface 32 does not extend along the entire surface of the gasket that engages the inner pipe. The low coefficient of friction surface 32 may only extend partially along the surface that engages the inner pipe 14 to aid in the initial insertion of the inner pipe into the gasket. In this alternative embodiment, once the inner pipe 14 is inserted completely into the gasket, the second section 24 of gasket material contacts the surface 19. In this embodiment, sealing contact is provided with both the low coefficient of friction surface and the second section 24 of gasket material.

Figure 4:
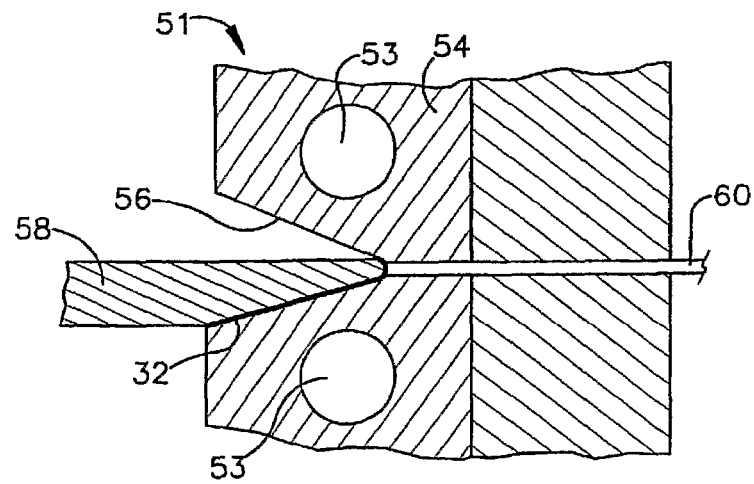
FIG. 4 is a sectional view showing a low coefficient of friction film inserted into a mold.

FIGS. 4-9 illustrate a method of producing a gasket with a low coefficient of friction film. FIG. 4, illustrates placement of a low coefficient of friction film 32 into a mold cavity defined by a wall portion 56 of the center platen 54 of the mold 51. The mold cavity can be customized to define any desired shape of gasket. The film 32 is formed or cut to fit the profile of the injection mold cavity so that it covers the desired portion of the final molded gasket. In the exemplary embodiment, the low coefficient of friction film is preformed in long lengths and stored on a roll. An appropriate length of the film is cut from the roll prior to use. The film 32 is placed into the mold cavity via a robotic arm 58 having an electrostatic, mechanical or vacuum end that is used to place the film 32 into the cavity in the center platen 54 of the mold 51. The film 32 is held in place in the mold electro statically, mechanically, or by a vacuum. It is also contemplated that the film 32 can be secured in the mold by electrostatic means or by an injection of a small amount of material, which can temporarily hold the film in place until the final injection of the gasket is completed. The arm 58 extends into the mold cavity releasing the film 32 onto the mold cavity wall portion 56. In an alternative embodiment, the low coefficient of friction material is injected into the mold cavity or sprayed on the surface of the mold cavity. One material used for the low coefficient of friction film is sold under the name Santoprene® 103-40 and commercially available from Advanced Elastomer Systems. Alternate film materials such as polypropylene, polyethylene, polyacrylates, or other engineering resin-based films having one or more layers are also suitable materials for achieving the desired physical properties.

Figure 5:
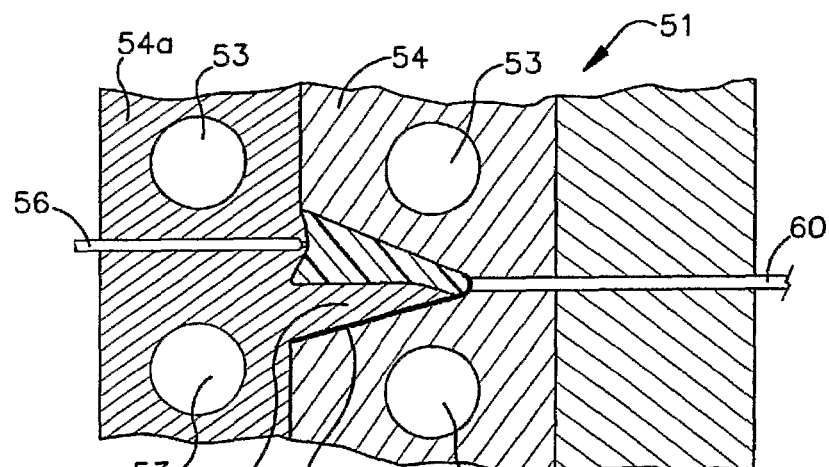
FIG. 5 is a sectional view showing a gasket material injected into a mold.

Referring to FIG. 5, the mold 51 is closed by relatively positioning platen 54a with respect to a center platen 54. The low coefficient of friction film 32 is held in the mold cavity of the center platen 54 by platen 54a. The stationary platen 54a includes a lip portion 55 that occupies a portion of the mold cavity so that after the first injection, a partial void remains when the stationary platen 54a is subsequently removed from the center platen 54. The lip portion 55 also holds the low coefficient of friction film in the center platen 54. The portion of the mold cavity unfilled by the lip 55 defines the first section 20 of the gasket 16, which is injected through a first injection port 56. The injection port 56 injects a rigid material into the unfilled portion of the mold cavity. One acceptable rigid material is sold under the name Exxpol Enhance 8224E1, an impact polypropylene copolymer, which is commercially available from Exxon Mobil Chemical having a place of business at. 5000 Bayway Drive Baytown, Tex. 77520-2123, USA.

The process to prepare the material for injection is well known in the art.

Figure 6:
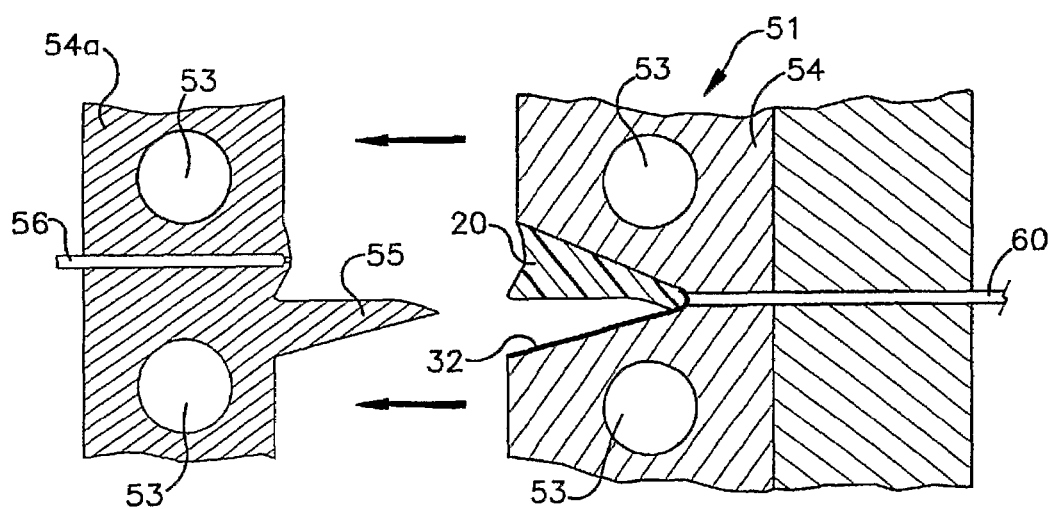
FIG. 6 is a sectional view showing a gasket material and low coefficient of friction film in a mold.
Figure 7:
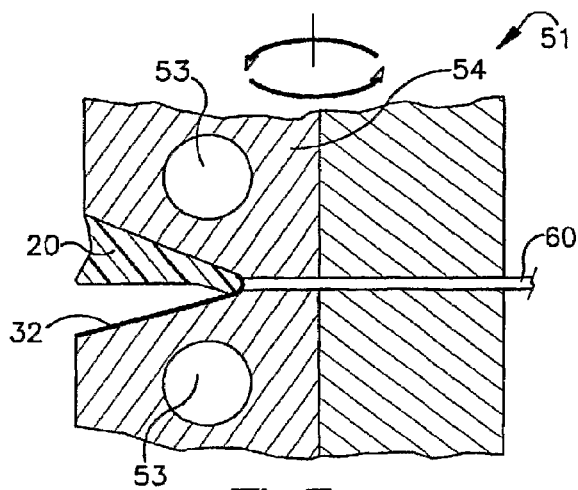
FIG. 7 is a sectional view showing a gasket material and low coefficient of friction film in a mold.

Referring to FIG. 6, the mold 51 is opened by separating the platen 54a from the center platen 54. The first injection of material forming the first section 20 of the gasket 16 remains in the mold cavity and is then permitted to cool. All the portions of the mold include water lines 53, which aid in rapid cooling of the injected material. A void remains between much of the film 32 and the injected rigid material. Referring to FIG. 7, the mold 54 is then spun on its vertical axis communicate with a second paten 54c (See FIG. 7). To simplify the illustration of gasket 16, the second platen 54c is shown on the same side of the center platen 54 as the first platen 54a. After the first injection is cool, the center platen 54 is closed once again with the second platen 54c. The illustrated second platen 54c includes a concave void, defined by a internal wall 63 that will be filled with elastomeric gasket material and form the second section 24 of the gasket 16 along with the void created by the lip portion 55 of the platen 54a.

Figure 8:
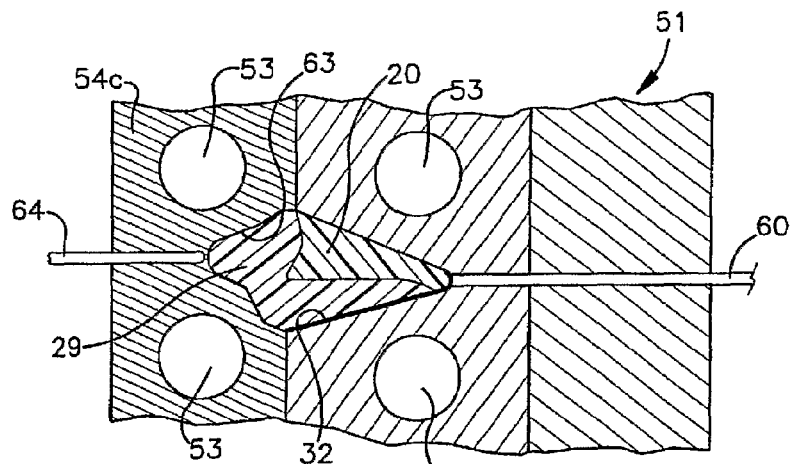
FIG. 8 is a sectional view showing a second gasket material injected into a mold.

A second injection port 64 injects a gasket material into the mold cavity (as shown in FIG. 8). The gasket material is material commonly used to form gaskets such as an elastomer, particularly a thermoplastic elastomer, and more particularly a dynamically vulcanized thermoplastic elastomer, which though formable as a thermoplastic retains elastomeric properties. The durometer of the gasket type material is disclosed above and is relatively lower than that of the material of the first section 20. Once the gasket material is injected, it is subsequently permitted to cool. Upon injection, the gasket material contacts both the first injected rigid material and the low coefficient of friction film. The rigid material and the film fuse to the gasket material in such a way that the final gasket appears as if it was molded in one injection. However, the gasket is defined by three different materials each having a different compositional makeup. One gasket material that can be used to form the second section 24 of the gasket through the second injection are the "soft" thermoplastic vulcanizates (Shore A durometer less than about 65) and are commercially available, e.g., Santoprene® 101-55W185 sold by Advanced Elastomer Systems, L.P.

Figure 9:
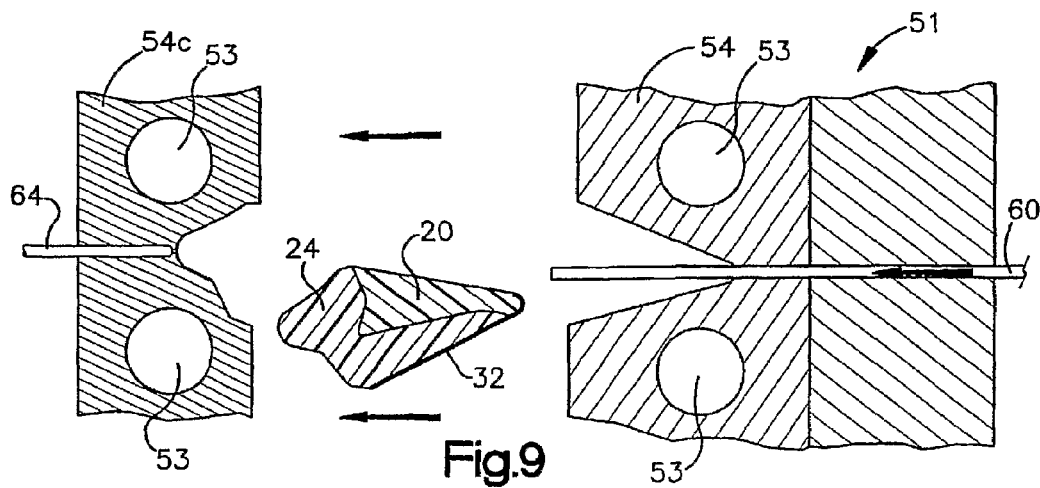
FIG. 9 is a sectional view of a dual durometer gasket with a low coefficient of friction film.

As illustrated in FIG. 9, the injected gasket material is cooled and the mold 51 is opened by separating the second platen 54c and the center platen 54. Upon separation, it is possible that the molded gasket 16 will remain in the center platen 54 of the mold 51. An ejector pin 60 may be used to aid in releasing the molded gasket 16 from the mold 54. The molded gasket 16 includes a first section 20 of rigid material, a second section 24 of gasket type material and a third section of low coefficient of friction film 32 which are all bonded together to form an integral gasket.

In an alternative embodiment, a low coefficient of friction film may be applied to the finished gasket. A first section of rigid material is injected into the mold and allowed to cool. Next, a second section of material having a relatively lower durometer is injected into the mold and cooled. The mold is then opened exposing a gasket having two sections. A low coefficient of friction film is then applied by spraying a low coefficient of friction material onto the gasket. One such low coefficient of friction material is a specially formulated ultraviolet cured material available from BASF Coatings AG. Once the film is applied to the gasket, it is permitted to "cure" thus becoming an integral low coefficient of friction film on a surface of the gasket. Unlike applying known lubricants to a gasket, the low coefficient of friction material adheres to the gasket eliminating the need to reapply the material.

While the invention has been described with a degree of particularity, it is the intent that the invention includes all modifications and alterations falling within the spirit and scope of the appended claims.

We claim:

1. A method for making a gasket having a low coefficient of friction surface for use in creating a seal between adjoining pipe sections comprising the steps of:
   a. inserting a freely supported low coefficient of friction film having a pre-formed curved portion into a mold cavity;
   b. injecting a first material having a first durometer into the mold;
   c. cooling the first material;
   d. injecting a second material having a second, relatively lower durometer, the pre-formed curved portion covering and bonding with said first and second materials;
   e. cooling the second material; and
   f. ejecting the formed gasket having a low coefficient of friction film surface from the mold.

2. The method of claim 1 wherein the low coefficient of friction film having a pre-formed curved portion is bonded with said first and second materials at a point in which said first material is in contact with said second material.

3. A method for making a gasket for use in creating a seal between adjoining pipe sections comprising the steps of:
   a. inserting a freely supported pre-formed low coefficient of friction film having a pre-formed curved portion into a mold cavity;
   b. injecting a first portion of rigid material into the mold;
   c. allowing sufficient time to cool the first injection;
   d. injecting a second portion of gasket material, the pre-formed curved portion covering and bonding with said first and second portions;
   e. cooling the second portion of material; and
   f. ejecting the formed gasket from the mold.

4. An annular elastomeric gasket for providing a fluid-tight seal between an inner pipe and an outer pipe, when the pipes are in a relative surrounded and surrounding relationship, comprising:
   a. a gasket portion configured to sealingly engage the inner and outer pipes when the pipes are in a relative surrounded and surrounding relationship, the gasket having an engagement side of a first durometer material and a support side formed from a second durometer material having a relatively higher durometer than said first durometer material, the engagement side of said gasket contacting an inner pipe during assembly; and
   b. a freely supported pre-formed low coefficient of friction film permanently applied to an exposed surface of the gasket portion and surrounding at least a portion of said support side and extending along the entirety of the engagement side of said gasket in the area contacting said inner pipe during assembly.

5. The gasket of claim 4 wherein the low coefficient of friction film is applied to the gasket portion in a mold.

6. The gasket of claim 4 wherein the low coefficient of friction film is bonded to the gasket portion.

7. The gasket of claim 4 wherein the low coefficient of friction film is applied to the gasket portion by spraying.

8. The gasket of claim 7 wherein said spray comprises UV cured systems, chemical or thermally cured systems.

9. The gasket of claim 4 wherein the low coefficient of friction film is preformed into an annular ring.

10. A molded annular gasket for providing a fluid-tight seal between an inner pipe and an outer pipe when the inner pipe and the outer pipe are in a relative surrounded and surrounding relationship, comprising:
    a. a gasket comprising a first elastomeric material having an engagement portion of a first durometer and a second elastomeric material having a support portion having a second durometer higher than said first durometer, the gasket configured to sealingly engage the inner and outer pipes when the pipes are in a relative surrounded and surrounding relationship; and
    b. a pre-formed annular low coefficient of friction film molded to an outer surface of the gasket portion, forming a bond with said support and engagement portions.

11. An annular gasket for sealing adjoining pipe sections comprising:
    a. a first polymeric section circumscribing a first region of said annular gasket, said first polymeric section having a first durometer;
    b. a second polymeric section having a second durometer circumscribing a second region of said annular gasket, said second polymeric section being bonded with said first polymeric section; and
    c. a third polymeric section having a third durometer circumscribing a third region of said annular gasket, said third polymeric section being cohered with said first and second polymeric sections;
    d. wherein said third polymeric section includes a low coefficient of friction region located along a portion of a section of said annular gasket that engages a first corresponding pipe for aiding in the coupling of adjoining pipe sections.

12. The annular gasket of claim 11, wherein said first durometer of said first polymeric section is at least a Shore A 87 durometer.

13. The annular gasket of claim 11, wherein said second durometer of said second polymeric section is about Shore A 55 durometer.

14. The annular gasket of claim 11, wherein said third durometer of said third polymeric section is at least a Shore D 40 durometer.

15. The annular gasket of claim 11, wherein said low coefficient of friction region extends along the entire annular gasket section that engages said first corresponding pipe.

16. The annular gasket of claim 11, wherein said first polymeric section is a thermoplastic.

17. The annular gasket of claim 11, wherein said second polymeric section is an elastomer.

18. The annular gasket of claim 11, wherein said third polymeric section is a resin-based film.

19. The annular gasket of claim 11, wherein said third polymeric section is preformed into an annular ring.

20. The annular gasket of claim 11, wherein said first region of said annular gasket is adapted to seal an annular groove in a second corresponding pipe.

21. The annular gasket of claim 11, wherein said second region of said annular gasket is adapted to become partially compressed in said second polymeric section to aid in sealing said pipe joint.

* * * * *